United States Patent
Suciu et al.

(10) Patent No.: US 7,406,052 B2
(45) Date of Patent: Jul. 29, 2008

(54) METHOD FOR DATA-SIGNAL QUALITY CONTROL, A RELATED RECEIVER AND A RELATED TRANSMITTER

(75) Inventors: Radu Suciu, Ghent (BE); Etienne André Hubert Van Den Bogaert, Schaarbeek (BE); Jeroen Celina Karel Van Elsen, Ekeren (BE); Jan Sylvia Verlinden, Wommelgem (BE)

(73) Assignee: ALCATEL, Paris (FR)

( * ) Notice: Subject to any disclaimer, the term of this patent is extended or adjusted under 35 U.S.C. 154(b) by 686 days.

(21) Appl. No.: 10/937,292

(22) Filed: Sep. 10, 2004

(65) Prior Publication Data
US 2005/0058156 A1 Mar. 17, 2005

(30) Foreign Application Priority Data
Sep. 12, 2003 (EP) .................................. 03292255

(51) Int. Cl.
*H04L 12/26* (2006.01)
*H04J 1/02* (2006.01)
*H04B 1/38* (2006.01)

(52) U.S. Cl. .................. 370/252; 370/493; 375/222

(58) Field of Classification Search ................. 370/229, 370/252, 235, 236, 480–485, 236.1, 236.2, 370/493–495; 375/346–349, 222
See application file for complete search history.

(56) References Cited

U.S. PATENT DOCUMENTS

| | | | |
|---|---|---|---|
| 5,265,151 A | 11/1993 | Goldstein | |
| 6,061,427 A | 5/2000 | Ryoo | |
| 6,084,906 A * | 7/2000 | Kao et al. | 375/220 |
| 6,219,378 B1 * | 4/2001 | Wu | 375/231 |
| 6,459,678 B1 * | 10/2002 | Herzberg | 370/203 |
| 6,487,241 B1 | 11/2002 | Cole | |

OTHER PUBLICATIONS

Nov. 2003 DSL Forum Talk in Paris (enclosed).
T1E1.4 Contribution 2003-325 dated Dec. 8-12, 2003.
T. Starr et al, DSL Advances, Prentice-Hall (2003 Edition).
George Ginis et al, "Vectored Transmission for Digital Subscriber Line Systems", IEEE JSAC special issue on twisted-pair transmission, vol. 20, Issue 5, pp. 1085-1104, Jun. 2002.

(Continued)

*Primary Examiner*—Chi H. Pham
*Assistant Examiner*—Tri H Phan
(74) *Attorney, Agent, or Firm*—Sughrue Mion, PLLC

(57) ABSTRACT

The present invention relates to a method for data-signal quality control, a related receiver and a related transmitter in an XDSL communications system, where this XDSL communications system comprises a transmitter and a receiver. The transmitter is coupled to the receiver over an XDSL line, over which the transmitter sends a data-signal on a plurality of data carriers for carrying this data-signal from the transmitter to the receiver. This receiver analyses a quality of the data-signal received by the receiver and subsequently requests the transmitter, in case this quality of the data-signal is beneath a predefined level to improve the quality of the data-signal, by performing an equal transmit power increase over a plurality of the data-carriers. The transmitter in response to the requesting improves the data-signal by performing an equal transmit power increase over at this plurality of data-carriers.

7 Claims, 2 Drawing Sheets

OTHER PUBLICATIONS

J.M. Cioffi, Chapter 4 "Generalized Decision-Feedback Equalization for Packet Transmission with ISI and Gaussian Noise" from *Communications, Control of Signal Processing: A Tribute to Thomas Kailath* (A. Paulraj et al, Ed.), Kluwer Academic Publishers, 1997.

T1E1.4 contribution 2002-069—Feb. 18, 2002.

T1E1.4 contribution 1992-203—Dec. 1, 1992.

A. Weissberger et al, "ADSL-DMT Out of Service Tests, Simplified Start-up Procedure(s), and Layer Management Protocols," Standards Project: ADSL Testing and Management, Brussels, Belgium; Sep. 16-17, 1997 (enclosed).

ITU-T G.992.1 dated Jun. 1999, "Series G: Transmission Systems and Media, Digital Systems and Networks"—Asymmetric Digital Subscriber Line (ADSL) Transceivers.

ITU-T G.992.2 —dated Jun. 1999, "Series G: Transmission Systems and Media, Digital Systems and Networks"—Splitterless asymmetric digital subscriber line (ADSL) transceivers.

* cited by examiner

METHOD FOR DATA-SIGNAL QUALITY CONTROL, A RELATED RECEIVER AND A RELATED TRANSMITTER

The present invention relates to a method for data-signal quality control in an XDSL communications system as described in the preamble of claim 1, the related receiver as described in the preamble of claim 2 and the related transmitter as described in the preamble of claim 3.

Such a method and related devices are already known in the art, e.g. from the section "AOC on-line adaptation and reconfiguration", pages 119-123 of ITU-T Recommendation G.992.1 with title "*Asymmetric digital subscriber line (ADSL) transceivers*" published in June 1999 by the International Telecommunications Union (ITU).

Therein, it is described that the transmit power in an XDSL-system is distributed over all data-carriers, called subcarriers, resulting in a certain Power Spectral Density (PSD) value for each carrier. This transmit power is attenuated by the travelling along the channel and results in a certain, reduced, receive power at the receiver. Moreover, the channel also has the characteristic to add noise to the signal. From this attenuated signal together with the added noise a Signal to Noise Ratio can be determined. Based on this Signal to Noise Ratio, the number of bits that can be transmitted on each carrier while still guaranteeing a certain maximum error-rate, can be determined. This number of bits then is transmitted on each data carrier by the transmitter once the transmitter is in showtime.

As the channel characteristic due to certain conditions, such as new upcoming disturbers or weather conditions and noise changes in time, the Signal to Noise Ratio of the signal changes also. Hence, due to the changing channel characteristics and noise the current Signal to Noise Ratio may differ from the Signal to Noise Ratio that is required to transmit the previously determined number of bits per carrier while still guaranteeing a certain maximum error-rate. In order to retune the Power Spectral Density value for each carrier to a new value that fits to the changed current channel characteristics and noise on the channel without interrupting the data-flow, to guarantee a stable communication, a bit swap is performed.

Because of the fact that in ADSL version 1 as described in the above mentioned ITU-T Recommendation G.992.1, the bit swap mechanism is only able to change at most 4 (normal bit swap request) or 6 (extended bit swap request) tones every second, the modem can go out of showtime before having the time to perform all the necessary bit swaps if the noise conditions on the line are changing rapidly.

Furthermore, in ADSL version 2, as described in ITU-T Recommendation G.992.2 the bit swap mechanism is bigger and may include all carriers in the bit swap which constitutes an improvement compared to the ADSL version 1. In this case however, the bit swap request message to be transferred is large and if the noise on the line is high, the probability that the received bit swap request message is corrupt is still considerably present.

An object of the present invention is to provide a data-signal quality control method, a transmitter and a receiver of the above known type for data-signal quality control but wherein the data-signal quality control is executed in such way that the stability of the modem increases significantly.

According to the invention, this object is achieved by the power transmit control method as described in claim 1, the receiver as described in claim 2 and the transmitter as described in claim 3.

Indeed, by requesting the transmitter, in case the quality of the data-signal received by the receiver DRE is beneath a predefined level to improve the quality of the data-signal by performing an equal transmit power increase over a plurality of the data-carriers and by subsequently, in response to the requesting of the receiver, improving the data-signal by performing an equal transmit power increase over the plurality of the data-carriers by the transmitter, the Power spectral density over each of the datacarriers of the plurality of data-carriers is increased to such a level that the signal to noise ratio is sufficiently high for guaranteeing a stable modem behaviour. In this way the signal-to-noise ratio has improved to such an extent and within a very short time that the modem-stability increases significantly and that the transmission of data can be executed with a significant lower probability of corrupt frames compared to the existing bit swap-method.

An additional characteristic feature of the present invention is described in claim 4.

By executing a bit swap on data-carriers for transporting a data-signal from the transmitter to the receiver after the transmit power increase over the plurality of the data-carriers, this bit swap is executed for fine-tuning the power spectral density resulting from the transmit power increase.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
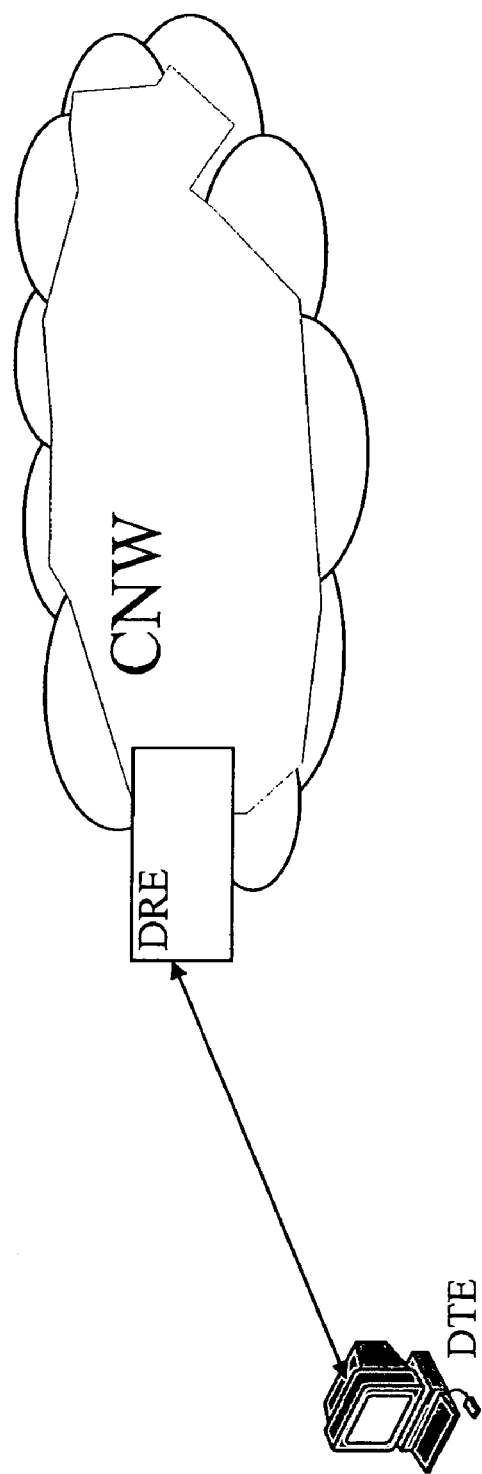
FIG. 1 represents an XDSL communications system.
Figure 2:
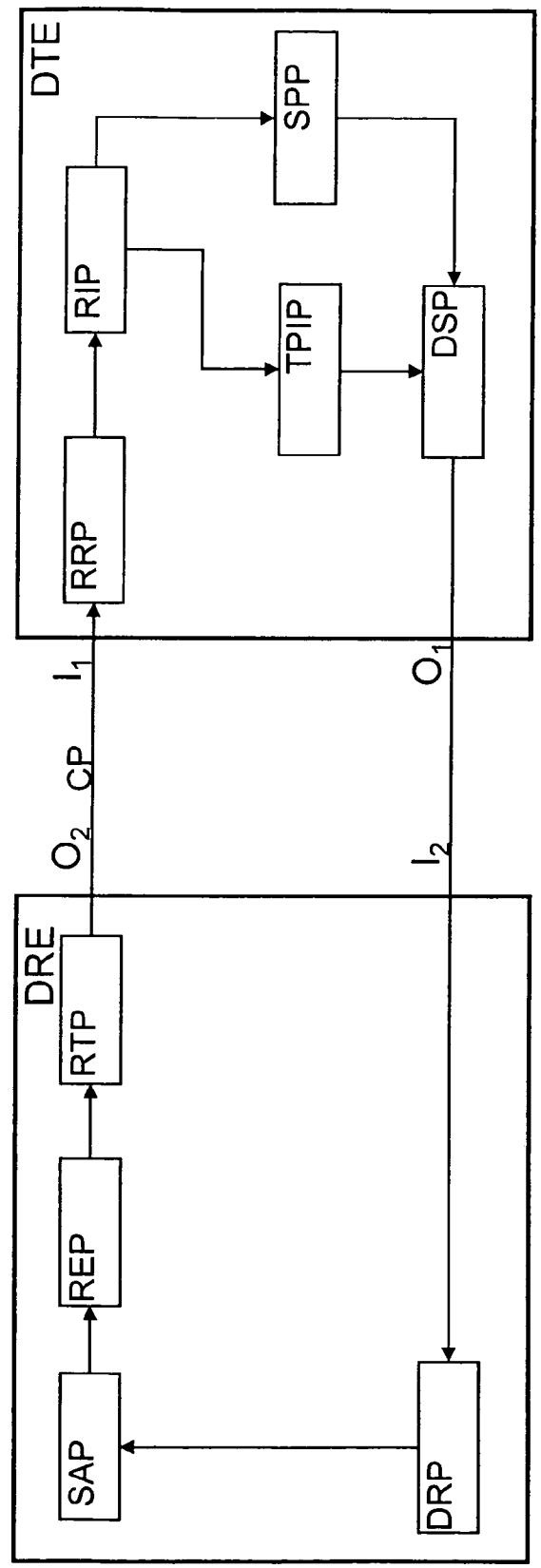
FIG. 2 represents the functional representation of the transmitter DTE and the receiver DRE as presented in FIG. 1.

In the following paragraphs, referring to the drawings, an implementation of the power transmit control method, a transmitter and a receiver according to the present invention will be described. In the first paragraph of this description the main elements of the XDSL system as presented in FIG. 1 are described. In the second paragraph, all connections between the before mentioned elements and described means are defined. Subsequently all relevant functional means of the transmitter and receiver as presented in FIG. 2 are described followed by a description of all interconnections. In the succeeding paragraph the actual execution of the data signal quality control method is described.

The essential elements of the Digital Subscriber Line communications system network of the embodiment according to the present invention are a transmitter, in this embodiment chosen to be a user terminal and a receiver here chosen to be a central office coupling the transmitter to a communications network CNW which here is chosen to be the internet. The transmitter is able to send data towards the receiver by modulating this data on a plurality of carriers according any of the XDSL standards such as the ADSL and VDSL standards.

In order to keep simplicity in this description it is chosen to only describe one transmitter and one receiver although such an XDSL communications network usually comprises a plurality of transmitters and receivers.

The transmitter DTE is coupled over a copper twisted pair, e.g. the commonly known POTS network to the receiver DRE.

The receiver DRE first comprises a data receiving part DRP that is adapted to receive data transmitted by an XDSL transmitter where this data is modulated on carriers according any of the XDSL standards and a signal analysis part SAP that is able to analyse the quality of the received data-signal that is transmitted by said transmitter DTE. The receiver DRE further comprises a Request Establishing part REP that is adapted to formulate a request for the transmitter DTE to improve the quality of the data-signal in case the quality of the data-signal is beneath a predefined level. In the present invention this Request Establishing part REP is adapted to formulate the request to improve the quality of the data-signal by performing an equal transmit power increase over a plurality of the data-carriers. The Request transmitting part RTP, that after formulating the request by the Request Establishing part REP is adapted to forward this request towards the transmitter DTE.

The Request Establishing part REP is coupled with an input to an output of the signal analysis part SAP. The signal analysis part SAP is coupled with an input to an output of the Data receiving part DRP. The Request transmitting part RTP in its turn is coupled with an input to an output of the Request Establishing part REP and further has an output that is at the same time an output-terminal $O_2$ of the receiver DRE.

The transmitter DTE first comprises a data sending part DSP that is adapted to send data towards an XDSL receiver where this data is modulated on carriers according any of the XDSL standards and further comprises a request reception part RRP that is adapted to receive from said receiver DRE a request to improve the quality of the data-signal. Additionally the transmitter DTE comprises a request interpreting part RIP that is able to interpret the request to improve the quality of the data-signal and determine which action is to be executed. The transmitter DTE further comprises a transmit power increasing part TPIP that is adapted to perform a transmit power increase over the plurality of the data-carriers in response to said request to improve said quality of said data-signal. The transmitter DTE may additionally comprise a bit swap performing part SPP that is able to perform a bit swap on data-carriers for transporting a data-signal from said transmitter to said receiver DRE after the transmit power increase over the plurality of the data-carriers.

The data sending part DSP has an output that is at the same time an output-terminal $O_1$ of the transmitter DTE and has an input that is coupled to an output of the transmit power increasing part TPIP. The data sending part DSP further has an input that is coupled to an output of the bit swap performing part SPP. The request interpreting part RIP is coupled with an input to an output of said request reception part RRP. The request reception part RRP has an input that is at the same time an input-terminal $I_1$ of the transmitter DTE. The transmit power increasing part TPIP further is coupled with an input to an output of the request interpreting part RIP.

The additional bit swap performing part SPP is coupled with an input to an output of the request interpreting part.

In order to explain the present invention it is assumed that due to the additional noise and external conditions, such as an upcoming new disturber, the Signal-to-Noise Ratio has decreased to such an extent that an improvement of the quality of the data-signal, is necessary in order to guarantee that the error-rate of the data-transmission remains beneath a certain predetermined maximum level. The signal analysis part SAP of the receiver DRE analyses the quality of the received data-signal that is transmitted by said transmitter DTE. In case the quality of the data-signal is beneath a predefined level, i.e. a level wherebeneath a maximum error rate in the data-transmission is not guaranteed the Request Establishing part REP will formulate a request for the transmitter DTE to improve the quality of the data-signal. In the present invention this Request Establishing part REP will formulate the request to improve the quality of the data-signal by performing an equal transmit power increase over a plurality of the data-carriers. The Request transmitting part RTP, after formulating the request by the Request Establishing part REP then transmits this request towards the transmitter DTE over the control path CP. The request reception part RRP receives the request to improve the quality of the data-signal from the receiver DRE. The interpreting part RIP subsequently will interpret the request to improve the quality of the data-signal and determine which action is to be executed. The transmit power increasing part TPIP then performs a transmit power increase over the plurality of the data-carriers in response to said request to improve the quality of said data-signal.

This transmit power increase improves the signal-to-noise ratio to such an extent and within a very short time that the modem-stability increases significantly and that the transmission of data can be executed with a significant lower probability of corrupt frames compared to the existing bit swap-method.

Then in order to fine-tune the data-signal with an overall transmit power increase, the bit swap performing part SPP performs after the transmit power increase a bit swap on the carriers for transporting a data-signal from said transmitter DTE to said receiver DRE.

It is to be noted that the transmit power increase over the plurality of the data-carriers may be a transmit power increase over all the data-carriers in order to realise a signal to noise ratio improvement over the entire spectrum of the signal, however this also may be a transmit power increase over a subset of data-carriers, where the subset consists of more than one datacarrier, in order to improve the signal ratio improvement over a predetermined part of the entire spectrum of the signal. In the last case a power saving is realises in comparison to the first scenario.

Bit swap messages are sent from receiver to transmitter to adapt the bit loading and/or the transmit energy of the carriers to the changing line conditions.

The XDSL receiver may further comprises a bit swap initiating part SIP that is adapted to formulate, based on criteria such as the Signal-to Noise Ratio, a request to perform a bit swap on carriers for transporting a data-signal from the transmitter DTE to the receiver DRE and the XDSL receiver additionally comprises a bit swap request transmitting part STP that is adapted to transmit a request to perform a bit swap on carriers for transporting a data-signal from the transmitter DTE to the receiver DRE.

It is further to be noted that although only one direction of data transmission is described together with the mechanism of the present invention for that direction, the present invention is also applicable for data transmission in the other direction.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. Method for data-signal quality control in an XDSL communications system, said XDSL communications system comprising a transmitter and a receiver, said transmitter being coupled to said receiver over an XDSL line, said transmitter sending a data-signal on data-carriers for carrying said data-signal from said transmitter to said receiver, said method comprising the following steps:
   a. said receiver analyzing a quality of said data-signal received by said receiver, wherein said method further comprises the following steps:
   b. said receiver requesting said transmitter, in case said quality of said data-signal is beneath a predefined level to improve said quality of said data-signal, by performing an equal transmit power increase over a plurality of said data-carriers; and
   c. said transmitter in response to said requesting improving said data-signal by performing an equal transmit power increase over a plurality of said data-carriers.

2. The method for data-signal quality control in an XDSL communications system according to claim 1, wherein said predefined level is a level wherebeneath a maximum error rate in the data transmission is not guaranteed.

3. The method for data-signal quality control in an XDSL communications system according to claim 1, wherein said data-carriers include a plurality of data-carriers.

4. The method for data-signal quality control in an XDSL communications system according to claim 3, wherein said plurality of data-carriers include data-carriers according to an XDSL standard.

5. Receiver for use in an XDSL communications system, said XDSL communications system comprising a transmitter and said receiver, wherein said receiver receives a data-signal on data-carriers for carrying said data-signal transmitted by said transmitter, said receiver comprising the following parts:
   a. a signal analysis part (SAP), which analyzes a quality of said received data-signal transmitted by said transmitter;
   b. a Request Establishing part (REP), coupled with an input to an output of said signal analysis part (SAP) and which formulates a request for said transmitter to improve said quality of said data-signal in case said quality of said data-signal is beneath a predefined level; and
   c. a Request transmitting part (RTP), coupled with an input to an output of said Request Establishing part (REP) and which forwards said request towards said transmitter wherein said Request Establishing part (REP) of said receiver formulates said request to improve said quality of said data-signal by performing an equal transmit power increase over a plurality of said data-carriers.

6. Transmitter for use in an XDSL communications system, said XDSL communications system comprising said transmitter and a receiver, said transmitter sending a data-signal on data-carriers for carrying said data-signal from said transmitter to said receiver, said transmitter comprising the following parts:
   a. a request reception part (RRP), which receives from said receiver (DRE) a request to improve a quality of said data-signal,
   b. a request interpreting part (RIP), coupled with an input to an output of said request reception part (RRP) and which interprets said request to improve said quality of said data-signal; and, a transmit power increasing part (TPIP), coupled with an input to an output of said request interpreting part (RIP) and which performs an equal transmit power increase over a plurality of said data-carriers in response to said request to improve said quality of said data-signal.

7. Transmitter according to claim 6, wherein said transmitter flirt her comprises a bit swap performing part (SPP), coupled with an input to an output of said request interpreting part (RIP) and which performs a bit swap on data-carriers for transporting a data-signal from said transmitter to said receiver after said transmit power increase over said plurality of said data-carriers.

* * * * *